United States Patent [19]

Perrott et al.

[11] 3,895,496

[45] July 22, 1975

[54] TOOL FOR INSTALLATION OF FLEXIBLE GROUND CONDUIT

[75] Inventors: Lloyd J. Perrott; Robert D. Stores, both of Eugene, Oreg.

[73] Assignee: Lloyd J. Perrott, Eugene, Oreg. ; a part interest

[22] Filed: Oct. 5, 1973

[21] Appl. No.: 403,817

[52] U.S. Cl. ............... 61/63; 29/200 J; 29/237; 29/431; 33/382; 61/72.1; 214/1 PA; 294/99
[51] Int. Cl. ............................................. E02b 1/00
[58] Field of Search ....... 29/200 J, 200 P, 431, 237; 33/382; 61/63, 72.1; 214/1, 1.4, 1 PA; 294/99

[56] References Cited
UNITED STATES PATENTS

| | | | |
|---|---|---|---|
| 2,689,412 | 9/1954 | Young | 33/382 UX |
| 3,143,371 | 8/1964 | Bloch et al. | 294/99 R X |
| 3,377,809 | 4/1968 | Hujber | 61/63 |
| 3,561,615 | 2/1971 | Farsberg | 29/237 |
| 3,568,455 | 3/1971 | McLaughlin et al. | 61/72.1 |
| 3,657,786 | 4/1972 | Wiswell | 29/237 X |

*Primary Examiner*—Charlie T. Moon
*Attorney, Agent, or Firm*—James D. Givnan, Jr.

[57] ABSTRACT

A tool for attachment along a flexible conduit to temporarily impart rigidity to the conduit length to facilitate conduit handling and installation. An elongate member of the tool mounts a series of highly flexible clips adapted for flexed engagement about the conduit circumference. The elongate member retains the conduit against flexing during setting of the conduit to grade with adjacent conduit lengths. The highly flexible clips release the emplaced conduit upon lifting of the elongate tool member with the conduit remaining in place by the weight of gravel aggregate thereon.

2 Claims, 8 Drawing Figures

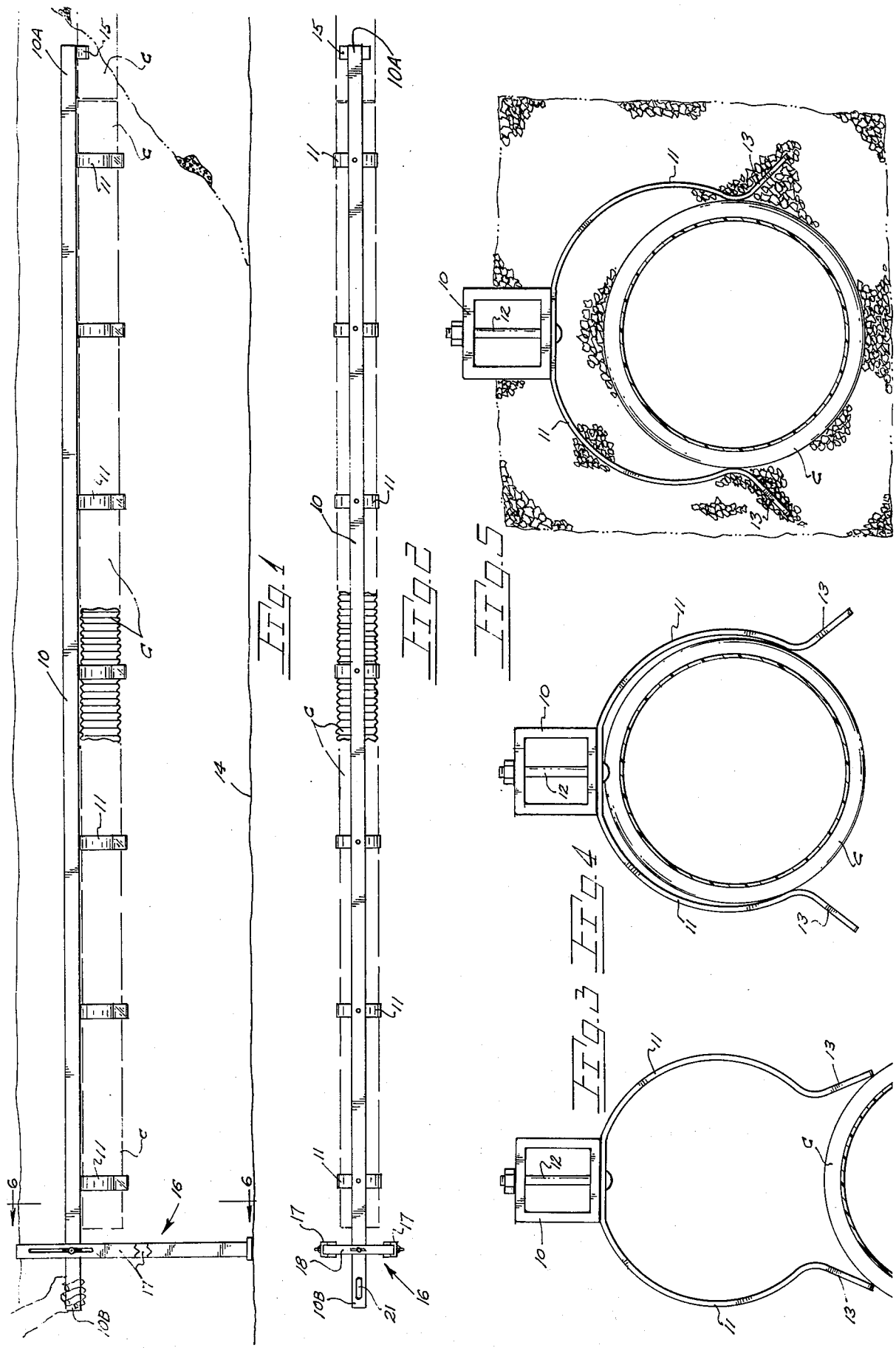

PATENTED JUL 22 1975
3,895,496
SHEET 2
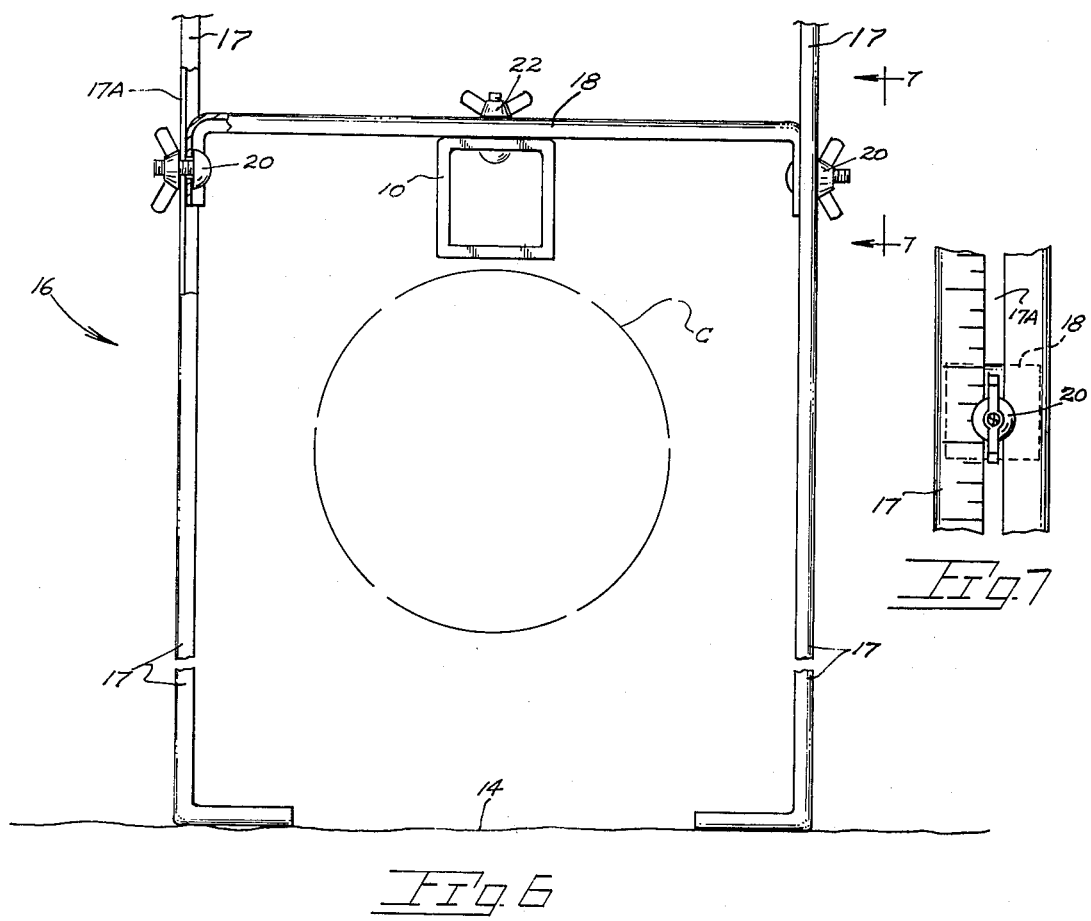
Fig. 6
Fig. 7
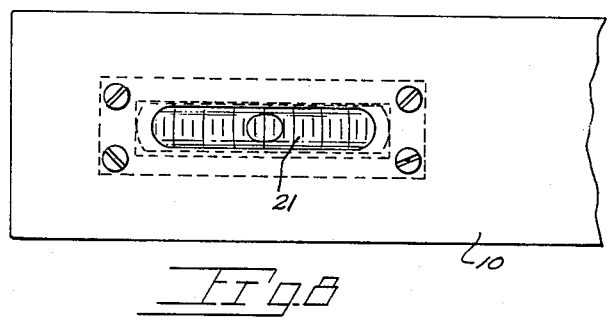
Fig. 8

TOOL FOR INSTALLATION OF FLEXIBLE GROUND CONDUIT

BACKGROUND OF THE INVENTION

The present invention relates generally to a method and tool for the setting or laying of flexible conduit to grade within a ground opening such as a trench in a drain field.

In laying of flexible pipe or conduit such as the type used for septic tank drainage systems, the conduit must be laid to grade to assure a proper drainage flow. In the past, the laying of rigid wall pipe presented few problems as the conduits rigid nature facilitated handling and setting of same at the desired position. Rigid conduit sections could be manually set in place with gravel being added or removed from thereunder to achieve the grade desired.

The introduction of corrugated plastic conduit was well received with such conduit now being in wide use. One drawback to corrugated plastic conduit resides in the fact that by reason of it being of a flexible nature it is decidedly more difficult to handle at the site and to lay accurately to grade. To overcome the flexible characteristic of corrugated plastic conduit during laying, installers have utilized wooden two-by-fours temporarily inserted in the conduit. A distinct disadvantage to the use of a two-by-four is that it requires that the ditch extend several feet beyond the last conduit section laid to permit withdrawal and upward removal of same. A further disadvantage is that the two-by-four is not supported at its remote end but rather requires visual checking of the opposed conduit ends to assure proper alignment. A still further disadvantage is that the inserted two-by-four and conduit are at no time connected in a positive manner thus hindering accurate conduit placement.

SUMMARY OF THE PRESENT INVENTION

The instant tool is embodied within an elongate rigid member having a series of longitudinally spaced clips secured therealong to temporarily receive a length of conduit section to impart rigidity to same during conduit installation. For conduit alignment purposes one end of said member is adapted for rested engagement upon the end segement of the previously laid conduit for purposes of precise conduit alignment. The circular clips on said member are of a lightly biased nature to permit clip-conduit disengagement simply upon lifting the clip bearing elongate member while the buried conduit remains in place. Aggregate deposited over the tool and conduit holds the latter against the slight upward forces exerted thereon during clip separation. A sighting may be taken on the conduit end or end of the tool to check for the desired condit grade prior to such separation.

A modified form of the tool includes level means enabling the installer to check the conduit installation for the grade desired without use of a transit sighting.

A still further form of the invention provides for supporting one end of the tool by means of a vertically adjustable support structure which assures the conduit ends all being at a desired height above a ditch bottom. Additionally, the stand may be utilized for the purpose of laying a series of conduits to grade by successive downward adjustments of the stand after each conduit section is put into place.

Important objectives of the present invention include the provision of: a tool having an elongate rigid member temporarily receiving a length of flexible conduit and imparting rigidity to same enabling convenient, accurate placement of the conduit within a ditch; a tool having a series of lightly biased clips readily engageable with the conduit surface and, conversely, detachable from a gravel embedded conduit without dislodgment of the conduit from its desired position; a tool facilitating the alignment of a conduit length with previously laid conduit sections; a tool having support means thereon for successively reducing the distance between a conduit end and a ditch bottom.

BRIEF DESCRIPTION OF THE DRAWINGS

In the drawings:

FIG. 1 is a side elevational view of the present tool in use with a fragment of the conduit being laid shown in place thereon, FIG. 2 is a plan view of the tool taken along line 2—2 of FIG. 1, FIG. 3 is a vertical sectional elevational of the tool with a conduit fragment shown prior to clip engagement, FIG. 4 is a view similar to FIG. 3 with the conduit shown in place within an outwardly flexed clip, FIG. 5 is a view similar to FIG. 3 and 4 but with the conduit embedded within aggregate and with the clip partially removed from the conduit, FIG. 6 is a sectional elevational view of the support structure taken along line 6—6 of FIG. 1, FIG. 7 is a fragmentary view of the support structure taken along line 7—7 of FIG. 6, and FIG. 8 is a plan view of level means carried by the tool.

DETAILED DESCRIPTION OF THE PREFERRED EMBODIMENT

With continuing reference to the accompanying drawings wherein applied reference numerals indicate parts similarly identified in the following specification, the reference numeral 10 indicates an elongate rigid member of the present tool which member may be of metal tubing of square or other suitable sectional configuration. Member 10 has a supported end 10A and a vertically positionable end 10B as later elaborated upon.

The member 10 mounts a series of clips 11 spaced at intervals along one side of the rigid member and attached by fasteners 12 extending through said member. Each clip 11 is of a flexible nature and may be of clock spring steel formed on a radius somewhat less than the radius of a later inserted drainage conduit at C. Outwardly turned end segments 13 of each clip are disposed so as to permit simultaneous encompassing engagement of the clips simply by urging the tool downwardly into place on the conduit. The highly flexible nature of the clips and the segments 13 permits convenient tool attachment. As later described, separation of tool and conduit is equally quickly accomplished.

The conduit C is inherently lightweight by reason of its being formed from polyethylene or an equivalent plastic with a corrugated wall thickness of approximately one-eighth inch. Said conduit is aperatured for the discharge of drainage matter into a drain field opening or ditch, the earthen bottom of which is indicated at 14. Typically, such ditches are dug to a depth of approximately 2 feet with the ditch being filled with permeable material such as sand and gravel.

To assure conduit alignment with a previously laid conduit, a curved plate 15 is welded or otherwise secured to the conduit supported end 10A of member 10. Located adjacent the opposite end 10B of member 10 in a detachable manner is a support structure generally at 16 comprising upright supports 17, slotted at 17A (FIG. 7) which slidably support a crosspiece 18 (FIG. 6) which in turn carries the vertically positionable end 10B of elongate member 10. Bolt and wing nut assemblies 20 at each end of the crosspiece permit positioning and locking of the crosspiece 18 to supports 17 at the selected height above ditch bottom 14. Supports 17 may be provided with an inch scale reading inches above the ditch bottom.

Additionally provided for the purpose of setting the conduit to grade is a level 21 which may be of the type having a bubble indicating the horizontal or inclined disposition of member 10. In setting of the conduit to a constant grade, crosspiece 18 would be successively adjusted downwardly with the laying of each conduit with the off center bubble indicating a desired degree of inclination for each conduit laid.

If so desired a support structure 16 may be detached from rigid member 10 simply by removal of a bolt and nut assembly 22 whereupon member 10 will be manually supported by a workman at the desired elevation until the gravel is placed in the trench. With the support structure removed the workmen may rely on the indicator 21 or alternatively may be assisted by transit sightings taken on the exposed, positionable end 10B of member 10 by another workman.

In operation the tool is applied to a length of conduit the latter being somewhat less than the tool length whereupon the joined tool and conduit are placed into the ditch with rigid member end 10A protruding over and resting on the end of a previously laid conduit as viewed in FIG. 1. Gravel aggregate is deposited into the ditch covering both the conduit and the tool with the exception of the left hand end of the tool as viewed in FIG. 1. Vertical movement of the tool end is then accomplished to achieve the desired grade of the attached conduit. For detachment of the tool from the conduit without displacement of the latter, an upward force is imparted to the exposed end 10B of member 10 to release clips 11 from the conduit. Total separation of the tool from the conduit is best achieved by the application of opposite vertical forces in a rocking manner to the end of member 10 rocking same and resulting in the clips working upwardly through the gravel and away from the conduit.

For the purpose of setting the conduit to the desired slope or grade a sighting may be made on the end 10B of member 10 with a worker holding said end at the desired height until the ditch is filled with gravel to the extent the conduit is supported. In such an operation support structure 16 need not be utilized and the same may be removed for use in a subsequent conduit laying operation.

While we have shown but a few embodiments of the invention it will be apparent to those skilled in the art that the invention may be embodied still otherwise without departing from the spirit and scope of the invention.

Having thus described the invention what is desired to be secured under a Letters Patent is:

1. A hand tool for the manual setting to grade of consecutive flexible conduits below the ground surface, said tool comprising, an elongate rigid member, a series of clips depending at intervals from said elongate member, each of said clips being of a highly flexible nature and in a normal unflexed state having a bite of slightly lesser dimension than a cross-sectional dimension of the conduit, said clips having outwardly directed end segments contactable with the conduit during a closing movement between the tool and conduit, an arcuate plate attached to one end of said elongate member for rested placement on the end of a previously laid conduit to align a clip supported conduit with a previously laid conduit, a level located adjacent the other end of said rigid member for indicating to the worker the grade of the rigid member and hence the grade of the mounted flexible conduit, an adjustable support structure attached to the other end of said rigid member to permit support of the conduit at a desired grade while the worker backfills the conduit receiving trench, and said clips being disengageable from the conduit therein by the manual lifting of the elongate rigid member in the presence of backfill material bearing on the conduit.

2. The tool as claimed in claim 1, said adjustable support structure including a crosspiece located transversely of said rigid member adjacent said other end thereof, a pair of supports each laterally spaced oppositely from the rigid member and each defining a lengthwise orientated slot, fastener assemblies extending through each of said slots and through said crosspiece adjustably mounting the latter to the supports.

* * * * *